United States Patent [19]
Campbell et al.

[11] Patent Number: 5,517,847
[45] Date of Patent: May 21, 1996

[54] OPEN COMPARTMENT LOAD LEVELING RIDE HEIGHT CONTROL

[75] Inventors: Douglas C. Campbell, Dearborn; Gary J. Gloceri, West Bloomfield; Daniel M. McCoy, Shelby Township, all of Mich.

[73] Assignee: Ford Motor Company, Dearborn, Mich.

[21] Appl. No.: 356,989

[22] Filed: Dec. 16, 1994

[51] Int. Cl.$^6$ .......................... B60G 11/26; B60G 17/00; B60S 9/00; F16F 5/00
[52] U.S. Cl. .......................... 73/11.07; 73/118.1; 280/840
[58] Field of Search .................... 73/118.1, 11.04, 73/11.07, 865.9; 280/6.1, 6.11, 6.12, 703, 707, 708, 840

[56] References Cited

U.S. PATENT DOCUMENTS

| | | | |
|---|---|---|---|
| 4,517,832 | 5/1985 | Holland et al. | 73/118 |
| 4,674,768 | 6/1987 | Morra | 73/118.1 |
| 4,709,934 | 12/1987 | Suzuki et al. | 280/840 |
| 4,736,958 | 4/1988 | Armstrong | 280/840 |
| 4,741,206 | 5/1988 | Ishiguro et al. | 73/118.1 |
| 4,783,089 | 11/1988 | Hamilton et al. | 280/840 |
| 4,787,644 | 11/1988 | Yokote et al. | 280/840 |
| 4,800,751 | 1/1989 | Kobayashi et al. | 73/118.1 |
| 4,809,957 | 3/1989 | Schonfeld et al. | 280/6.1 |
| 4,822,063 | 4/1989 | Yopp et al. | 280/840 |
| 4,829,436 | 5/1989 | Kowalik et al. | 280/840 |
| 4,909,534 | 3/1990 | Fukushima et al. | 280/6.12 |
| 4,923,210 | 5/1990 | Heider et al. | 280/840 |
| 4,949,573 | 8/1990 | Wolfe et al. | 73/118.1 |
| 4,971,360 | 11/1990 | Pischke et al. | 280/840 |
| 4,973,078 | 11/1990 | Barthelemy et al. | 280/6.12 |
| 4,975,849 | 12/1990 | Ema | 280/840 |
| 5,013,067 | 5/1991 | Mine et al. | 280/840 |
| 5,083,275 | 1/1992 | Kawagoe et al. | 364/424.05 |
| 5,083,454 | 1/1992 | Yopp | 73/118.1 |
| 5,090,727 | 2/1992 | Kii et al. | 280/840 |
| 5,097,419 | 3/1992 | Lizell | 280/840 |
| 5,129,670 | 7/1992 | Camizuli | 280/6.12 |
| 5,162,995 | 11/1992 | Ikemoto et al. | 280/840 |
| 5,186,043 | 2/1993 | Yamaoka et al. | 73/118.1 |
| 5,193,849 | 3/1993 | Holzmann | 280/840 |
| 5,228,704 | 7/1993 | Tabe | 280/6.11 |
| 5,251,136 | 10/1993 | Fukuyama et al. | 280/840 |
| 5,258,913 | 11/1993 | Baldauf | 280/840 |
| 5,265,913 | 11/1993 | Scheffel | 280/840 |
| 5,273,308 | 12/1993 | Griffiths | 280/840 |
| 5,287,277 | 2/1994 | Mine et al. | 280/840 |
| 5,297,045 | 3/1994 | Williams et al. | 280/840 |
| 5,312,119 | 5/1994 | Schneider et al. | 280/840 |
| 5,373,445 | 12/1994 | Yopp | 280/840 |
| 5,401,053 | 3/1995 | Sahm et al. | 280/840 |

*Primary Examiner*—Richard Chilcot
*Assistant Examiner*—George M. Dombroske
*Attorney, Agent, or Firm*—Roger L. May; Gregory P. Brown

[57] ABSTRACT

Load leveling height control is provided for a vehicle by replacing a conventional scheduled vehicle height with a load leveling height which is sensed upon detection of the opening of at least one compartment of the vehicle. Load leveling height control raises and lowers the vehicle to maintain the load leveling height. While either a passenger compartment or a cargo compartment can be monitored, preferably both are monitored to protect the vehicle from potential damage both below and above the vehicle due to changes in vehicle height as a vehicle is loaded and/or unloaded. Any currently active leveling activity is aborted such that a load leveling height or open compartment height can be read and maintained as long as a compartment remains open or until vehicle speed reaches a predefined speed, for example 16 kilometers per hour (10 miles per hour), at which time the conventional scheduled vehicle height is once again utilized.

16 Claims, 2 Drawing Sheets

OPEN COMPARTMENT LOAD LEVELING RIDE HEIGHT CONTROL

BACKGROUND OF THE INVENTION

The present invention relates in general to motor vehicle suspension systems which include controllable ride height, for example by an air suspension control system, and, more particularly, to load leveling control for such vehicles which operates in response to opening a passenger or cargo compartment.

Motor vehicle suspension systems are connected between the body of the vehicle and the wheels to determine the ride and handling of the vehicle. Conventional suspension systems include springs and shock absorbers which are typically fixed such that the ride and handling are fixed and the level of the vehicle depends upon the loading of the vehicle.

More advanced suspension systems include controllable elements such as variable damping shock absorbers which permit two or more damping factors to be selected as needed. Controllable springs may also be included. Such springs are typically pneumatically or air controlled and are inflated to increase the spring rate of the overall vehicle spring system and deflated to decrease the spring rate. Vehicle suspensions including controllable springs may be electronically controlled to maintain a predetermined vehicle ride height relative to the wheels, regardless of fluctuations in the passenger and/or cargo weight. By maintaining ride height, heavily loaded vehicles and vehicles having uneven weight distributions benefit from improved outward appearances, ride and handling.

Unfortunately, existing vehicle suspension systems stop standard leveling action the moment a door of the vehicle is opened. While some systems stop all leveling action if a door is open, others could raise the vehicle with an open door to prevent damage to under body and trim components including doors, running boards and the like from contact with curbs and other obstructions as the vehicle is loaded. However, if a vehicle is being unloaded, it may be raised above the height at which its trunk lid or hatch door extends creating the possibility of damage to the trunk lid or hatch door due to contact with obstructions above the vehicle. Damage to the trunk lid or hatch door may occur whether a vehicle door is open or not since cargo compartments are not monitored in existing systems.

It is, thus, apparent that there is a need for an improved suspension control system to reduce the possibility of damage to a vehicle trunk lid or hatch door while passenger or cargo compartments are open.

SUMMARY OF THE INVENTION

This need is met by the load leveling height control of the present invention wherein a conventional scheduled vehicle height is replaced with a load leveling height which is sensed upon detection of the opening of at least one compartment of a vehicle. While either a passenger compartment or a cargo compartment can be monitored, preferably both are monitored to protect the vehicle from potential damage due to changes in vehicle height as a vehicle is loaded or unloaded.

Any currently active leveling activity is aborted such that a load leveling height or open compartment height can be read and maintained by appropriately raising and lowering the vehicle as long as a compartment remains open or until vehicle speed reaches a predefined speed, for example 16 kilometers per hour (10 miles per hour), at which time the conventional scheduled vehicle height is once again utilized.

In accordance with one aspect of the present invention, a method for load leveling the ride height of a vehicle having a body, wheels and a controllable suspension connected between the body and the wheels comprises the steps of: monitoring the opened/closed status of at least one compartment of the vehicle; sensing a load level vehicle body height relative to the wheels upon detecting the opening of the at least one compartment of the vehicle; setting a desired vehicle height equal to the load level vehicle body height; and, controlling the controllable suspension by raising and lowering said vehicle body to maintain vehicle body height relative to the wheels substantially equal to the desired vehicle height.

In accordance with another aspect of the present invention, a method for controlling the ride height of a vehicle for use while the vehicle is stopped or traveling at a low speed, the vehicle having a body, wheels and a controllable suspension connected between the body and the wheels, comprises the steps of: sensing the speed of the vehicle; sensing the opening of a passenger or cargo compartment of the vehicle; activating load leveling control if the speed of the vehicle is equal to a load leveling activation speed; sensing a load level vehicle body height relative to the wheels to determine a vehicle height upon sensing the opening of a passenger or cargo compartment of the vehicle while load leveling control is activated; setting a desired vehicle height to equal the load level vehicle height; and, controlling the controllable suspension by raising and lowering said vehicle body to maintain vehicle body height relative to the wheels substantially equal to the desired vehicle height.

It is a feature of the present invention to provide an improved suspension control system including load leveling height control which sets a load leveling vehicle height in response to opening a passenger or cargo compartment of the vehicle and maintains that height by raising and lowering the vehicle.

Other features and advantages of the invention will be apparent from the following description, the accompanying drawings and the appended claims.

DETAILED DESCRIPTION OF THE INVENTION

Figure 1:
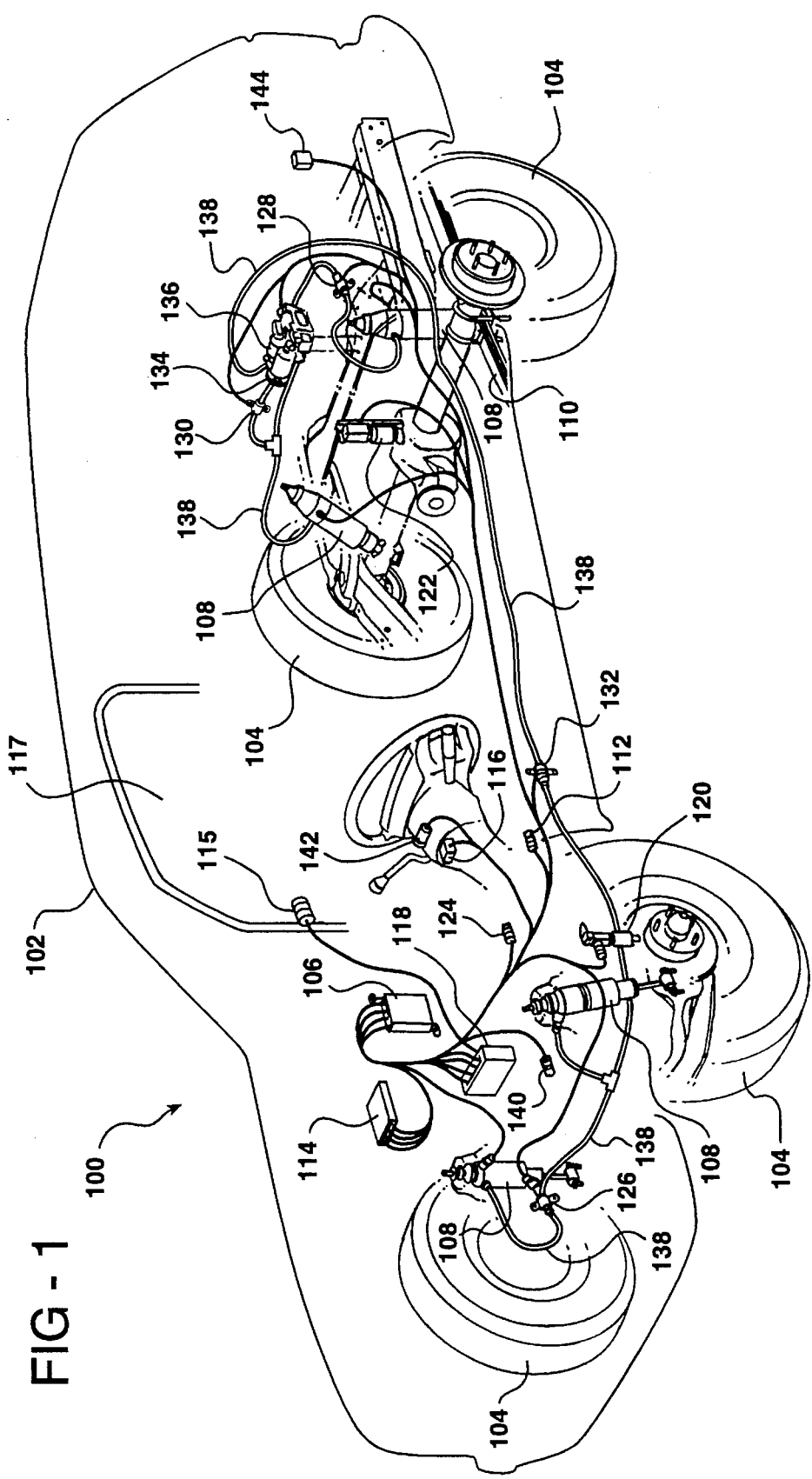
FIG. 1 is a perspective view of a vehicle, with the body shown in outline, including a controllable suspension system operable in accordance with the present invention.

The invention of the present application will be described with reference to a vehicle 100 and, more particularly, to a controllable suspension connected between a body 102 and wheels 104 of the vehicle 100 as illustrated in FIG. 1. The vehicle 100 includes an automatic ride control system having a computer controller 106 which controls the various components of the suspension. The four corners of the vehicle 100 are supported, in part, by two stage, firm and soft, shock absorbers 108 to provide a smooth ride for normal driving without sacrificing handling performance. An air spring integral with each shock absorber 108 permits load leveling and vehicle height adjustment over a span of approximately 50 mm (2 inches). Of course, air springs and shock absorbers which are separate from one another can be used for the suspension.

A smooth ride is achieved through selection of lower rate front torsion bars, not shown, and rear leaf springs 110, front and rear anti-roll bars, not shown, and selection of soft damping for the shock absorbers 108. Handling performance is maintained by reading driver and road inputs that, under certain conditions, switch the damping rate of the shock absorbers 108 to firm, minimizing body movement. Driver inputs may include: braking, monitored via a brake switch 112; throttle position, monitored via a primary engine control computer 114; steering rate and position, monitored via a steering sensor 116; and, since the illustrated vehicle 100 includes a selectable four wheel drive capability, transfer case setting, monitored via an electronic module 118. The electronic module 118 also monitors access into passenger and cargo compartments of the vehicle 100 for example by receiving signals from door switches such as a door switch 115 which detects opening of a door 117. Road inputs are sensed by a vehicle speed indicator 124 located near an output shaft of a transmission, not shown, of the vehicle 100 and two suspension mounted height sensors, a front height sensor 120 and a rear height sensor 122.

The automatic ride control system controls the height of the vehicle 100 on the front and rear axles separately through the use of an air compressor 136, air lines 138, and five solenoid valves: a front gate solenoid valve 126; a rear gate solenoid valve 128; a rear fill solenoid valve 130; a front fill solenoid valve 132; and, a vent solenoid valve 134. The vent solenoid valve is located in a cylinder head of the air compressor 136. The compressor 136 is controlled via a compressor relay 140.

Enclosed in each of the shock absorbers 108 is an air spring and a mechanism that enables switching between soft and firm damping. The air spring integrated into each of the shock absorbers 108 is capable of independently raising and lowering each corner of the vehicle 100 based on the pressure and volume of air supplied to it. The automatic ride control system regulates the pressure in each air spring by compressing and venting the air provided to it. As earlier noted, the air springs and shock absorbers 108 can be separate from one another. Further, since a variety of mechanisms are known for switching the damping rate of shock absorbers for motor vehicles, the shock absorbers will not be described in detail herein.

The air compressor 136 is connected to the shock absorbers 108 via the solenoid valves 126–132 and the air lines 138. The front shock absorbers 108 are controlled via the front fill solenoid valve 132 and the front gate solenoid valve 126. When the front fill solenoid valve 132 and the front gate solenoid valve 126 are energized, air pressure to the front shock absorbers 108 can be modified. The rear shock absorbers 108 are controlled via the rear fill solenoid valve 130 and the rear gate solenoid valve 128. When the rear fill solenoid valve 130 and the rear gate solenoid valve 128 are energized, air pressure to the rear shock absorbers 108 can be modified. The front and rear gate solenoid valves 126, 128 can be activated to isolate the left side of the vehicle from the right side of the vehicle.

The automatic ride control system is also under the control of a vehicle ignition switch 142 and a suspension control switch 144 which must be turned to the off position when the vehicle 100 is to be hoisted, jacked, towed, jump-started or raised off the ground.

Existing vehicle suspension systems which include controllable springs may be electronically controlled to maintain a desired vehicle ride height relative to the wheels, regardless of fluctuations in the passenger and/or cargo weight. The desired ride height may be fixed for a given vehicle or may be scheduled based, for example, on the speed of the vehicle. In one prior art suspension system, a low ride height is scheduled or selected for highway speeds to improve aerodynamics and handling of the vehicle and a high ride height is selected for lower speed operation to provide increased vehicle clearance and ease of entry and exit while the vehicle is stopped.

Unfortunately, existing vehicle suspension systems stop standard leveling action the moment a door of the vehicle is opened. While some systems stop all leveling action if a door is open, others could raise the vehicle with an open door to prevent damage to under body and trim components including doors, running boards and the like from contact with curbs and other obstructions as the vehicle is loaded. However, if a vehicle is being unloaded, it may be raised above the height at which its trunk lid or hatch door extends creating the possibility of damage to the trunk lid or hatch door due to contact with obstructions above the vehicle. Damage to the trunk lid or hatch door may occur whether a vehicle door is open or not since cargo compartments are not monitored in existing systems.

This problem is overcome by the load leveling height control of the present application by reading a load leveling height upon sensing the opening of at least one compartment of the vehicle and then raising and lowering the vehicle to maintain the load leveling height. For example, if a door is opened thereby opening a passenger compartment or if a hatch or trunk lid is opened thereby opening a cargo compartment, a load leveling height is read and maintained by appropriately raising and lowering the vehicle until the opened compartment is closed or the vehicle speed exceeds a predefined speed, such as 10 miles per hour.

Figure 2:
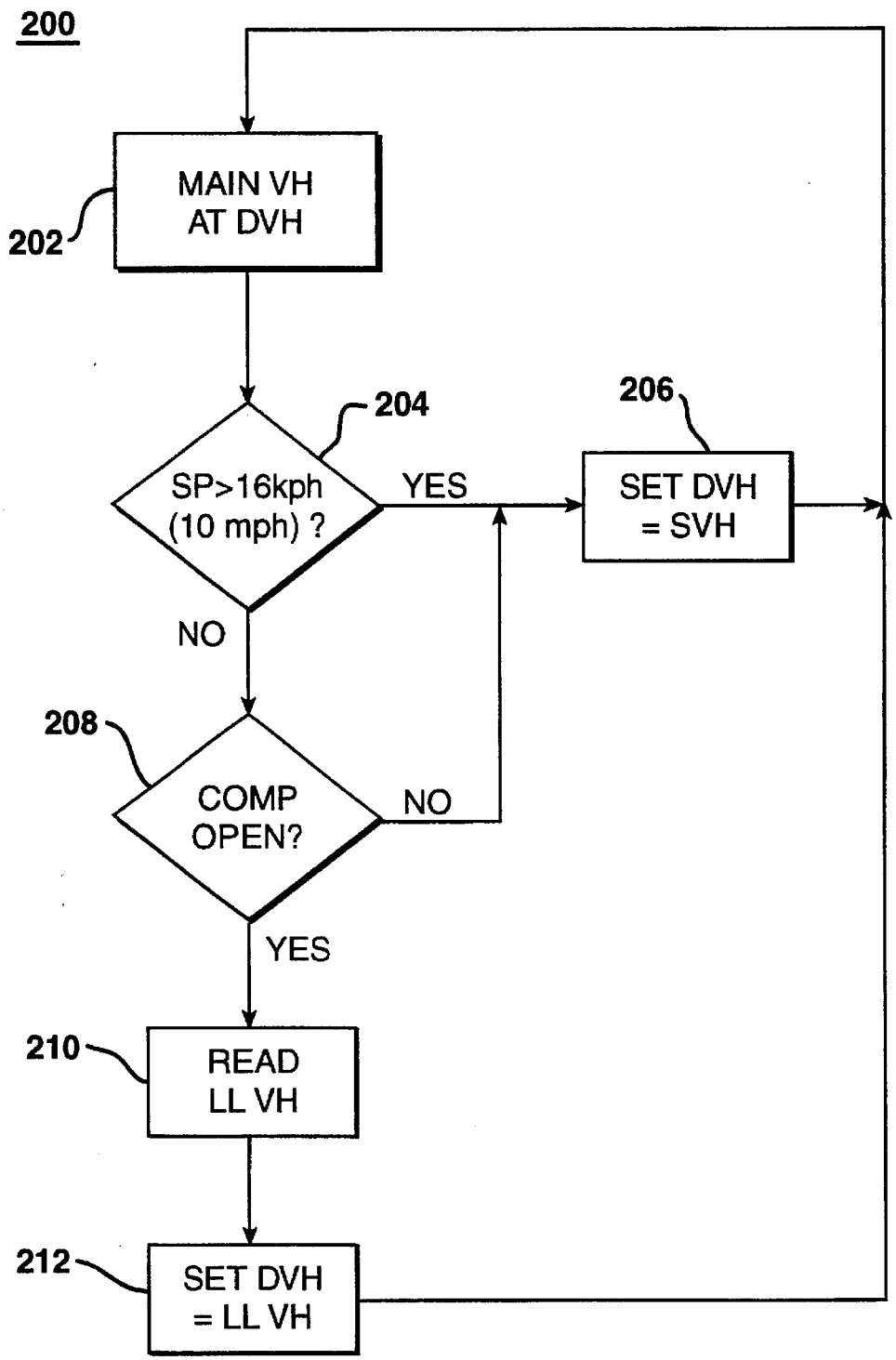
FIG. 2 is a flow chart showing illustrative steps for performing the invention of the present application.

Open compartment load leveling ride height control will now be described with reference to FIG. 2 which is a flow chart 200 showing illustrative steps for operation of the invention. The computer controller 106 monitors height signals generated by the front height sensor 120 and the rear height sensor 122 and regulates the pressure in each air spring by compressing and venting the air provided to it to maintain vehicle height (VH), i.e. the height of the body 102 relative to the wheels 104, at a desired vehicle height (DVH), see block 202. The desired vehicle height (DVH) is normally the height which is scheduled or selected by the suspension control or automatic ride control system of the vehicle 100.

Open compartment load leveling could be applied regardless of the speed of the vehicle 100. However, it is preferred to monitor the speed of the vehicle 100 and enable open compartment load leveling only when the speed of the vehicle 100 is at or below an activation speed, such as 16 kilometers per hour, kph, (10 miles per hour, mph). It is also possible to require the vehicle 100 to be stopped before enabling open compartment load leveling. This also ensures that scheduled load leveling will be performed at speeds above the activation speed even if a hatch window or trunk remains open due to an extending load.

In any event, the speed of the vehicle is sensed and compared to an activation speed, such as 16 kph (10 mph). If the speed of the vehicle 100 is greater than the activation speed, the desired vehicle height (DVH) is set to the vehicle height which is scheduled or selected by the automatic ride control system (SVH), see blocks 204, 206.

If the speed of the vehicle 100 is less than or equal to the activation speed, signals from the electronic module 118 are monitored to determine when at least one compartment of the vehicle 100 is opened, see block 208. If a compartment is opened while open compartment load leveling is activated, the height of the vehicle 100 is immediately read as a load leveling vehicle height (LLVH) and the desired vehicle height (DVH) is set to the load leveling vehicle height (LLVH), see blocks 210, 212. The automatic ride control system then maintains the vehicle height at the load leveling vehicle height by appropriately raising and lowering the vehicle to prevent damage to the under body of the vehicle or the hatch or trunk lid of the vehicle.

Once all monitored compartments of the vehicle 100 are closed, the desired vehicle height (DVH) is set to the vehicle height which is scheduled or selected by the automatic ride control system (SVH), see blocks 208, 206. The desired vehicle height (DVH) also is set to the vehicle height which is scheduled or selected by the automatic ride control system (SVH) if the speed of the vehicle exceeds the activation speed.

As illustrated, vehicle height control is based on signals received from the front height sensor 120 and a rear height sensor 122; however, it should be apparent that vehicle ride height control could be based on ground sensing or other suspension sensor arrangements. Since the actual vehicle ride height control forms no part of the present invention, the various control arrangements will not be described in detail herein.

Having thus described the invention of the present application in detail and by reference to preferred embodiments thereof, it will be apparent that modifications and variations are possible without departing from the scope of the invention defined in the appended claims.

What is claimed is:

1. A method for load leveling the ride height of a vehicle having a body, wheels and a controllable suspension connected between said body and said wheels, said method comprising the steps of:
   monitoring the opened/closed status of at least one compartment of said vehicle;
   sensing a load level vehicle body height relative to said wheels upon detecting the opening of said at least one compartment of said vehicle;
   setting a desired vehicle height equal to said load level vehicle body height; and
   controlling said controllable suspension by raising and lowering said vehicle body to maintain vehicle body height relative to said wheels substantially equal to said desired vehicle height.

2. A method for load leveling the ride height of a vehicle as claimed in claim 1 further comprising the step of resetting said desired vehicle height equal to a defined height in response to detecting the closure of said at least one compartment of said vehicle.

3. A method for load leveling the ride height of a vehicle as claimed in claim 1 further comprising the step of defining said at least one compartment to be a passenger compartment.

4. A method for load leveling the ride height of a vehicle as claimed in claim 1 further comprising the step of defining said at least one compartment to be a cargo compartment.

5. A method for load leveling the ride height of a vehicle as claimed in claim 1 further comprising the step of defining said at least one compartment to be a passenger compartment and a cargo compartment.

6. A method for load leveling the ride height of a vehicle as claimed in claim 1 further comprising the steps of:
   sensing the speed of said vehicle; and
   enabling load leveling control if the speed of said vehicle is equal to or less than a load leveling activation speed.

7. A method for load leveling the ride height of a vehicle as claimed in claim 6 further comprising the step of setting said load leveling activation speed equal to zero.

8. A method for load leveling the ride height of a vehicle as claimed in claim 6 further comprising the step of setting said load leveling activation speed equal to a any speed within a range of low speeds.

9. A method for load leveling the ride height of a vehicle as claimed in claim 6 further comprising the step of resetting said desired vehicle height equal to a defined height upon sensing the speed of said vehicle to be greater than a predefined speed.

10. A method for load leveling the ride height of a vehicle as claimed in claim 9 further comprising the step of setting said predefined speed to approximately ten miles per hour.

11. A method for controlling the ride height of a vehicle for use while said vehicle is stopped or traveling at a low speed, the vehicle having a body, wheels and a controllable suspension connected between said body and said wheels, said method comprising the steps of:
    sensing the speed of said vehicle;
    sensing the opening of a passenger or cargo compartment of said vehicle;
    activating load leveling control if the speed of said vehicle is equal to or less than a load leveling activation speed;
    sensing a load level vehicle body height relative to said wheels to determine a vehicle height upon sensing the opening of a passenger or cargo compartment of said vehicle while load leveling control is activated;
    setting a desired vehicle height to equal said load level vehicle height; and
    controlling said controllable suspension by raising and lowering said vehicle body to maintain vehicle body height relative to said wheels substantially equal to said desired vehicle height.

12. A method for controlling the ride height of a vehicle as claimed in claim 11 further comprising the step of setting said load leveling activation speed equal to zero.

13. A method for controlling the ride height of a vehicle as claimed in claim 11 further comprising the step of setting said load leveling activation speed equal to any speed within a range of low speeds.

14. A method for controlling the ride height of a vehicle as claimed in claim 11 further comprising the steps of:
    continuing to perform the step of sensing the speed of said vehicle; and
    setting said desired height to equal a scheduled vehicle height if the speed of said vehicle is greater than a predefined speed.

15. A method for controlling the ride height of a vehicle as claimed in claim 14 further comprising the step of setting said predefined speed to approximately ten miles per hour.

16. A method for controlling the ride height of a vehicle as claimed in claim 12 further comprising the step of setting said desired height to equal a scheduled vehicle height in response to sensing the closing of all passenger and cargo compartments of said vehicle.

\* \* \* \* \*